United States Patent [19]

Behling

[11] Patent Number: 5,497,410
[45] Date of Patent: Mar. 5, 1996

[54] X-RAY SOURCE COMPRISING A TEMPERATURE SENSOR

[75] Inventor: Rolf Behling, Norderstedt, Germany

[73] Assignee: U.S. Philips Corporation, New York, N.Y.

[21] Appl. No.: 368,825

[22] Filed: Jan. 5, 1995

[30] Foreign Application Priority Data

Jan. 15, 1994 [DE] Germany ............... 44 01 066.4

[51] Int. Cl.$^6$ .................................................. H05G 1/26
[52] U.S. Cl. ................................. 378/202; 378/118
[58] Field of Search ........................ 378/202, 201, 378/130, 141, 114, 117, 118, 121

[56] References Cited

U.S. PATENT DOCUMENTS

| | | | |
|---|---|---|---|
| 2,914,594 | 11/1959 | Kanne et al. | 136/4 |
| 3,961,173 | 6/1976 | Perry et al. | 378/118 X |
| 4,019,063 | 4/1977 | Curry | 378/59 X |
| 4,032,788 | 6/1977 | Stege et al. | 378/118 X |
| 4,363,971 | 12/1982 | Ochmann | 378/112 X |
| 4,918,714 | 4/1990 | Adamski et al. | 378/118 X |
| 5,008,916 | 4/1991 | Le Guen | 378/200 X |

FOREIGN PATENT DOCUMENTS

| | | | |
|---|---|---|---|
| 0286193 | 10/1988 | European Pat. Off. | G01K 7/20 |
| 57021100 | 7/1980 | Japan | H05G 1/26 |

OTHER PUBLICATIONS

"Principles of Diagnostic X–ray Apparatus" Philips Technical Library, pp. 112–123, 1975.

Primary Examiner—David P. Porta
Attorney, Agent, or Firm—Jack D. Slobod

[57] ABSTRACT

The invention relates to an X-ray source, comprising a housing, an X-ray tube which is arranged therein and which is surrounded by a liquid insulating medium, and a temperature sensor for determining the temperature within the liquid insulating medium. A simple embodiment of the temperature sensor consists in that it comprises a measuring element which is in thermal contact with a spatial zone in the insulating medium and which assumes a uniform temperature which is dependent on the temperature distribution in the zone during operation of the X-ray source, and a temperature transducer which is thermally coupled to the measuring element and which generates an electric signal which is dependent on the temperature of the measuring element.

6 Claims, 1 Drawing Sheet

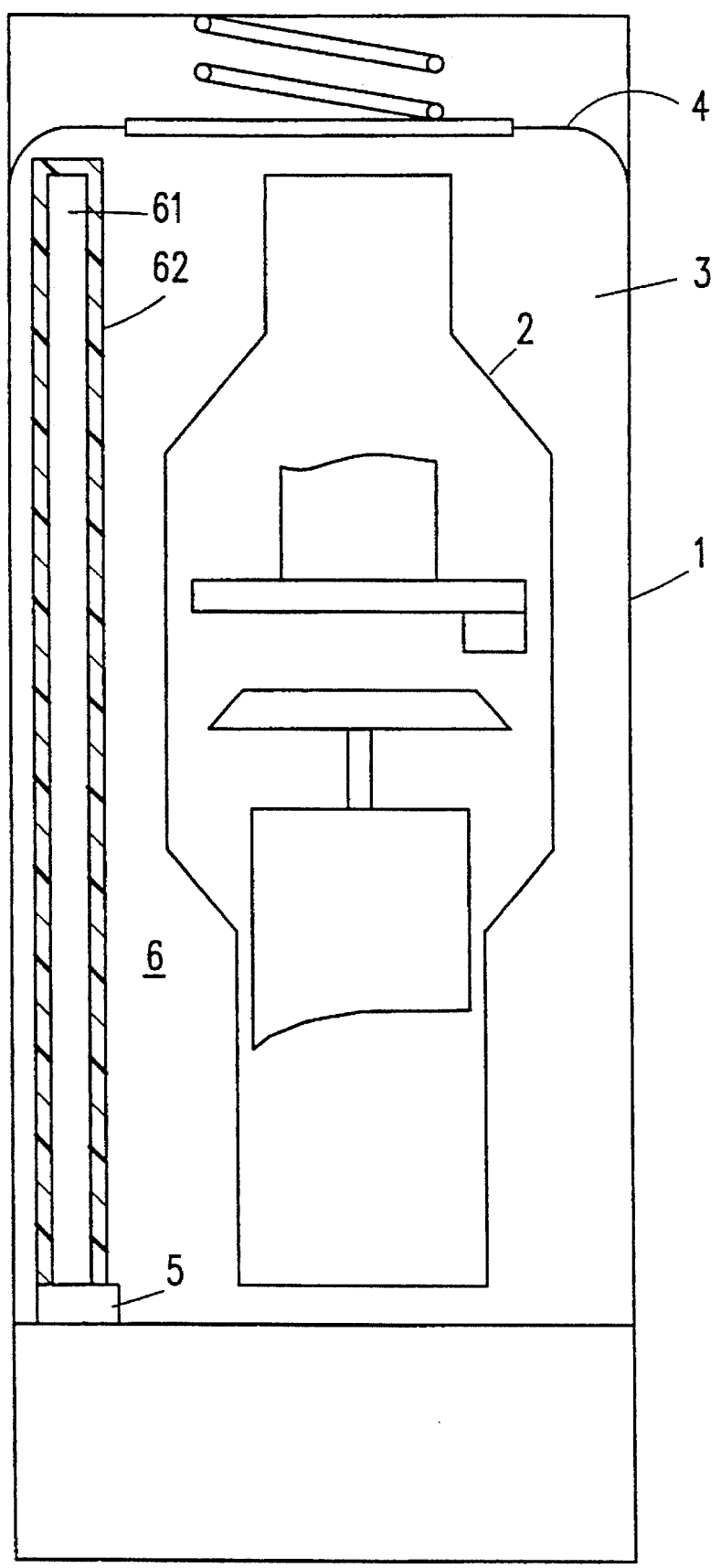

X-RAY SOURCE COMPRISING A TEMPERATURE SENSOR

BACKGROUND OF THE INVENTION

1. Field of the Invention

The invention relates to an X-ray source, including a housing, an X-ray tube which is accommodated therein and which is surrounded by a liquid insulating medium, and a temperature sensor for determining the temperature in the liquid insulating medium. The temperature sensor serves notably to interrupt the supply of energy to the X-ray source when the insulating medium reaches a given, mean temperature.

2. Description of the Related Art

An X-ray source which is known from the book by D. R. Hill "Principles of Diagnostic X-ray Apparatus", Philips Technical Library, pp. 122/123 utilizes the fact that the oil used as the insulating medium expands in response to heating and activates a switching contact via a rubber diaphragm. This is a mechanically complex and comparatively inaccurate construction.

SUMMARY OF THE INVENTION

It is an object of the invention to propose an X-ray source in which the temperature in the insulating medium can be determined more easily. In an X-ray source of the kind set forth this object is achieved in accordance with the invention in that the temperature sensor comprises a measuring element which is in thermal contact with a spatial zone in the insulating medium and which assumes a uniform temperature which is dependent on the temperature distribution in the zone during operation of the X-ray source, and also comprises a temperature transducer which is thermally coupled to the measuring element and which produces an electric signal which is dependent on the temperature of the measuring element.

The invention is based on the assumption that the temperature is not uniform throughout the insulating medium, in as far as the medium is not circulated by an external pump. Because of the thermal convection, the temperature of the insulating medium is always higher at the top than at the bottom. If it is also considered that the X-ray source is utilized in different positions, it will be evident that the temperature of the insulating medium cannot be determined by means of a sensor which measures the temperature exclusively in a single point within the X-ray source. In accordance with the invention, the temperature transducer does not measure directly the temperature of the insulating medium, but the temperature of a measuring element which is in thermal contact with the insulating medium and which is constructed so that it assumes a uniform temperature which is dependent on the temperature distribution in the zone of the insulating medium which is in contact with the measuring element.

For the temperature transducer use can be made notably of a thermal switch which triggers a switching operation when a given temperature is reached (for example, interruption of the supply of energy). Thermal switches of this kind are simpler and operate in a more reproducible manner than a switch which is actuated under the influence of a rubber diaphragm.

In a further embodiment of the invention, the measuring element is arranged inside the housing and is in direct thermal contact with the insulating medium. However, the measuring element can in principle also be arranged outside the housing when it is in thermal contact with the housing which itself is in thermal contact with the insulating medium.

In as far as the conduction of heat within the measuring element is sufficiently high in comparison with the heat transfer from the insulating medium to the measuring element, the temperature gradients in the measuring element are small. The heat then flows into the measuring element, or back from the measuring element into the insulating medium again, until a mean temperature exists in the measuring element. This can be achieved by selecting a sufficiently large cross-section for the measuring element. In a further embodiment of the invention, however, a smaller cross-section suffices when the measuring element comprises a solid metal body whose surface is enclosed by a thermally insulating sleeve. This sleeve may be made of, for example a synthetic material.

BRIEF DESCRIPTION OF THE DRAWINGS

The invention will be described in detail hereinafter with reference to the accompanying drawing in which the sole FIGURE is a view of the x-ray source of the present invention.

DETAILED DESCRIPTION OF THE PREFERRED EMBODIMENT

The X-ray source comprises an approximately cylindrical housing 1, preferably made of aluminium, and a rotary anode X-ray tube 2 which is accommodated therein. The rotary-anode X-ray tube is situated in a space 3 which is filled with an insulating medium in the form of oil and which is sealed by a rubber diaphragm 4 on at least one side, which diaphragm can accommodate the changing volume of the space 3 when the oil is heated.

The X-ray source can be operated in the position which is shown in the drawing and in which the rubber diaphragm is situated above the X-ray tube; however, operation is also possible in a position of the X-ray source in which the rubber diaphragm 4 is situated. underneath the X-ray tube. In both positions the temperature of the oil should be reliably determined and the supply of energy to the X-ray tube should be interrupted at a given temperature. The oil in the space 3, however, does not have a uniform temperature; because of thermal convection, the temperature of the oil at the top is higher than that of the oil at the bottom, for example, the oil temperature at the lower end of the space 3 is 65° C. and that at the upper end 85° C.

If the temperature were monitored, for example by means of a temperature sensor arranged in the lower part of the space 3, it would indicate a temperature value which is too low and this could lead to overheating of the oil. This could be avoided by interrupting the supply of energy to the X-ray tube 2 at a lower temperature already, but if the X-ray source had been rotated through 180°, the temperature sensor would then indicate a temperature value which is too high, so that the supply of energy would be interrupted already before the mean value of the oil temperature reaches its highest permissible value. The capability of the X-ray source could not be fully utilized in such a case.

In order to enable measurement irrespective of the orientation of the X-ray source there is provided a temperature transducer 5, for example a thermal contact, which is thermally coupled to a measuring element 6 in such a manner that it measures essentially only the temperature of the measuring element, but not that of the local environment. The measuring element 6 extends over the entire length of the oil-filled space 3 and is constructed so that it is assumes an essentially uniform temperature over its entire length, which temperature is dependent on the temperature distribution in the zone of the space 3 which is in contact with the measuring element. More specifically, the difference between the maximum temperature and the minimum temperature within the measuring element should be small in comparison with the difference between the maximum and the minimum temperature in the vicinity of the measuring element. Depending on the type of temperature distribution to be expected in the oil and on the selected cross-section of the measuring element, different configurations of the thicknesses of insulating material and measuring element are feasible to achieve the desired homogenization. The damping ratio D, being the ratio of the maximum temperature difference in the measuring element to the maximum temperature difference in the oil, is found approximately as (in as far as D is sufficiently small):

$$D=0.1*L*W*s^2$$

Therein, L represents the conduction of heat through the insulation and into the measuring element per unit of length (ignoring the oil-insulation transition value) and W denotes the heat resistance within the measuring element per unit of length; s is the overall length of the measuring element. For a measuring element 6 formed by a suitably thermally conductive body 61 having a circular cross-section and a specific thermal conductivity Lm, a diameter dm and a comparatively thin coating 62 of insulating material of thickness di and a specific thermal conductivity Li, it holds that $$W=4/(Lm*\pi*dm^2),$$

$$L=Li*\pi*dm/di$$

and, while ignoring the thermal fluxes at the end faces, for a practical temperature distribution approximately:

$$D=0.4*(Li/Lm)*s^2/(dm*di).$$

The aim is to minimize the damping factor. When the length of the measuring path is doubled, for example the thickness of the insulating material or the cross-section of the measuring sensor must be quadrupled in order to keep the damping factor constant. The aim is to achieve damping factors of less than approximately 0.3.

For a round copper bar having a length of 20 cm and a diameter of 2 cm (thermal conductivity 370 W/mK), covered with Rohazell of a thickness of 0.5 cm (thermal conductivity 0.35 W/mK) forming a thermally insulating sleeve enclosing the bar, for example a damping of 0.15 is obtained which suffices in practice, i.e. for a difference of 20K between the extreme temperatures outside the measuring element the difference between the maximum temperature and the minimum temperature occurring within the measuring element amounts to only 3K. This temperature inaccuracy can be tolerated when the supply of energy is to be interrupted at a temperature of, for example 85° C.

The measuring element may also be shaped as a ring or as a combination of one or more rings and one or more rods. It may also comprise several arms which enclose the X-ray robe 2 and which are joined in one point like a spider. For these different configurations it is only essential that the measuring element extends across the zone of the space 3 whose mean temperature value is to be monitored.

The measuring element may alternatively be arranged outside of and in direct thermal contact with the housing. Because the housing walls are comparatively thin, a temperature gradient occurs also along the housing wall and a uniform temperature value can be derived therefrom by means of the measuring element. It must then be ensured that the heat exchange between the measuring element and the environment outside the X-ray source remains as small as possible.

An elongate heat pipe would also be suitable as a further embodiment of a measuring sensor if said heat pipe has its working point in the vicinity of the switch-off temperature (for example, 85° C.) and provides equalization of the internal temperature distribution.

I claim:

1. An X-ray source, comprising a housing, an X-ray tube which is accommodated therein and which is surrounded by a liquid insulating medium, and a temperature sensor for determining the temperature in the liquid insulating medium, characterized in that the temperature sensor comprises a measuring element which is in thermal contact with a spatial zone in the insulating medium and which assumes a uniform temperature which is dependent on the temperature distribution in the zone during operation of the X-ray source, and also comprises a temperature transducer which is thermally coupled to the measuring element and which generates an electric signal which is dependent on the temperature of the measuring element.

2. An X-ray source as claimed in claim 1, characterized in that the measuring element is arranged inside the housing and is in direct thermal contact with the insulating medium.

3. An X-ray source as claimed in claim 1, characterized in that the measuring element comprises a metal body whose surface is enclosed by a thermally insulating sleeve.

4. An X-ray source as claimed in claim 2, characterized in that the measuring element comprises a metal body whose surface is enclosed by a thermally insulating sleeve.

5. An X-ray source as claimed in claim 3, characterized in that said thermally insulating sleeve is a coating applied to said metal body.

6. An X-ray source as claimed in claim 4, characterized in that said thermally insulating sleeve is a coating applied to said metal body.

* * * * *